United States Patent [19]
Haas

[11] Patent Number: 4,770,481
[45] Date of Patent: Sep. 13, 1988

[54] FIBER ANCHOR FOR A SPLICE HOUSING

[75] Inventor: John E. Haas, Boonton, N.J.

[73] Assignee: American Telephone and Telegraph Company, AT&T Bell Laboratories, Murray Hill, N.J.

[21] Appl. No.: 1,836

[22] Filed: Jan. 9, 1987

[51] Int. Cl.$^4$ ................................................ G02B 6/36
[52] U.S. Cl. ................................. 350/96.2; 350/96.23
[58] Field of Search .................... 350/96.23, 96.2, 96.1

[56] References Cited

U.S. PATENT DOCUMENTS

| 4,598,290 | 7/1986 | Collins et al. | 350/96.2 X |
| 4,629,286 | 12/1986 | Fuse et al. | 350/96.1 X |

OTHER PUBLICATIONS

*Analytical Mechanics for Engineers*, 4th Ed., by F. B. Seely et al., pp. 143–148.

*Handbook of Engineering Fundamentals*, Ed. by O. W. Eshbach et al., p. 484.
*Webster's New World Dictionary*, Ed. by D. B. Guralnik, 1972, The World Publishing Company, p. 211.

Primary Examiner—John Lee
Assistant Examiner—John Ngo
Attorney, Agent, or Firm—Richard B. Havill

[57] ABSTRACT

An optical fiber submarine cable splice housing includes a pressure vessel arranged for securely terminating an optical fiber cable and an optical fiber. A metallic tube formed into a helix is fixed to the cable termination. The optical fiber extends from the terminated cable and through the tube to a fiber termination on the splice housing. The tube acts like a capstan for the optical fiber so that a small tensile force at the fiber termination will hold the fiber in place while a much larger tensile force exists in the fiber where it leaves the cable termination.

3 Claims, 1 Drawing Sheet

U.S. Patent Sep. 13, 1988 4,770,481
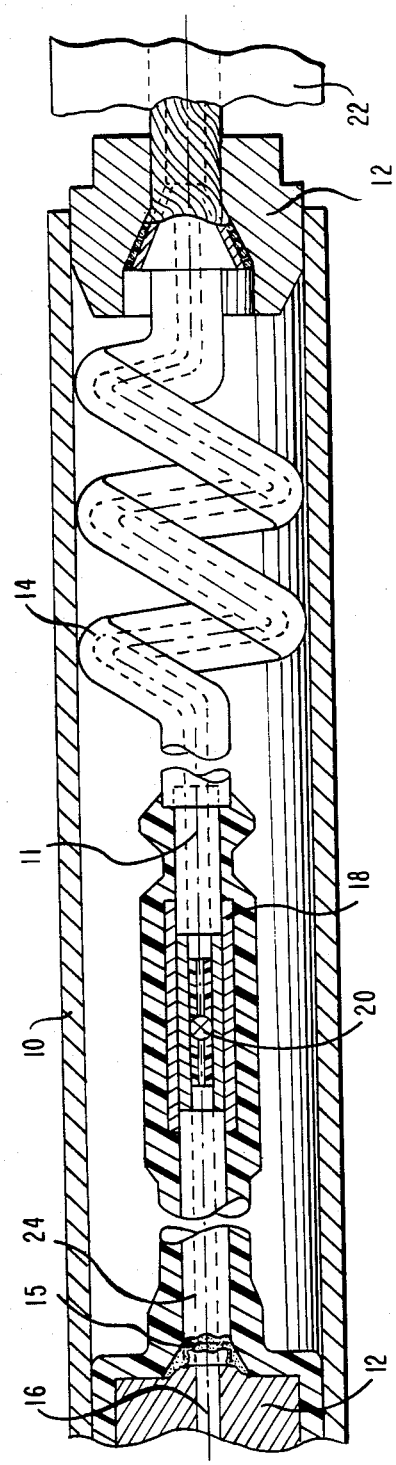
FIG. I

FIBER ANCHOR FOR A SPLICE HOUSING

The invention relates to a fiber anchor for an undersea lightwave cable splice housing and may be more particularly described as a fiber anchor using a helically shaped tube as a capstan for the fiber.

BACKGROUND OF THE INVENTION

In the prior art, an undersea lightwave cable splice housing includes a fiber coil chamber, which allows for fiber retraction and extension caused by cable tensioning and release. Fiber movement in the splice housing has been estimated to be as much as four inches over a long term. Space in the prior art fiber coil chamber limits fiber retraction to one and two-tenths inches. When retraction exceeds that limit, the fiber coil chamber acts as a capstan and limits further retraction.

The prior art undersea lightwave cable splice housing has been criticized for being too large for convenient handling during cable laying and recovery operations from shipboard. It is desirable to replace the prior art splice housing with a new smaller design. The smaller design will eliminate the fiber coil chamber from the splice housing.

A new fiber anchoring arrangment is needed for eliminating extension and retraction of the fiber in the new smaller splice housing without adding optical loss to the fiber.

SUMMARY OF THE INVENTION

This problem is solved for an optical fiber cable by an optical fiber termination arrangement including a metallic tube formed into a helix shape and fixed to the cable termination. The optical fiber is threaded through the tube and held by one end of the optical fiber at low stress, the optical fiber being tensioned so that the helically-shaped tube performs as a capstan for limiting retraction of the optical fiber into the cable.

BRIEF DESCRIPTION OF THE DRAWINGS

The arrangement and features of the invention may be more fully understood by reading the subsequent detailed description with reference to the drawing wherein FIG. 1 is a diagram of a splice housing for an optical fiber submarine cable.

DETAILED DESCRIPTION

Referring to FIG. 1, there is shown an undersea optical fiber splice housing 10 which, for example, is a cylindrical housing fabricated in beryllium copper or another strong material. The housing 10 is arranged with a cable termination 12 that may be similar to a cable termination disclosed in U.S. Pat. No. 4,507,008. The cable termination 12 is fixed to the splice housing 10 so that there will be no relative movement between the termination and the housing.

A new arrangement is provided for anchoring the optical fiber 11 so that, over an extended period of time, the fiber will not retract into the cable. This new arrangement includes a helically coiled small copper tube 14 overmolded with polyethylene. The tube 14 is fixed permanently to the cable termination 12 and the splice housing 10 to prevent relative movement between the small copper tube and the cable termination 12. The small copper tube 14 is brazed to a cylindrical block of metal 15 which is readily fixed to the cable termination hardware. The helix retains its original shape during use even though the helix is free from the splice housing along each side of the splice housing.

In one embodiment the helix was formed from a copper tube that has an outside diameter of 0.0565 inches. The inside diameter, 0.0255 inches, is large enough to readily accommodate a single optical fiber and its coating of ultraviolet light cured urethane acrylic. The coated optical fiber 11, which extends from the end of the cable, is threaded from the cable termination right through the entire length of the copper tube 14 while the copper tube is straight. After threading the coated optical fiber through the tube, the tube is formed into the helix shape. Then the end of the tube is fastened to the cable termination. The optical fiber end 11 that exits from the copper tube 14 is pulled snug and is fastened either to another fiber 16 or to the splice housing so that there is little or no relative movement between the end of the optical fiber 11 extending from the tube and the splice housing 10.

The helically-shaped copper tube 14 acts as a capstan for the optical fiber 11 remaining in the cable sheath. A small tensile force applied to the optical fiber end 11 which extends from the copper tube 14 will hold the fiber 11 from retracting into the cable even though a much greater tensile force occurs in the optical fiber 11 where it emerges from the terminated end of the cable 22.

This relationship can be expressed mathematically as follows:

$$\frac{T_2}{T_1} = e^{\mu \alpha} \tag{1}$$

where $T_1$ is the small load at the end of the fiber 11 extending from the copper tube 14, $T_2$ is the large load in the fiber 11 at the opposite end of the helix coil where it emerges from the cable 22, $\mu$ is the coefficient of friction between the copper tube 14 and the optical fiber coating, $\alpha$ is the angle of wrap in the helix in radians, and e is the base of natural logarithms. $T_2$ is limited by the maximum tensile strength of the optical fiber 11. The required coefficient of friction between the two materials can be determined by rearranging expression (1) as follows:

$$\mu = \frac{\ln \frac{T_2}{T_1}}{\alpha}. \tag{2}$$

Analysis of the expressions (1) and (2) shows that the holding ability of the optical fiber capstan is independent of the diameter of the helix. Thus it appears as though the helix can be any desired diameter. Another limit, however, is imposed on the radius of the helix and the bends in the tube at each end of the helix, which bends are used for aligning the ends of the tube with the center axis of the helix. The helix imparts a bending load to the optical fiber. Because of this bending load, it is desirable to optimize the helix radius in consideration of the maximum desirable radius of the splice housing and the desired fiber lifetime.

One way to hold the optical fiber end 11 is by splicing it to a pigtail optical fiber 16 which is secured to the splice housing. Such a pigtail optical fiber 16 is shown at the left side in FIG. 1. During splicing the copper tubes 14 and 24 are cut back from the end of each of the fibers. A copper sleeve 18 is placed over one of the small tubes and is slid out of the way for splicing. After the two fiber ends are spliced at 20, the annealed cylindrical copper sleeve 18, having an initial outside diameter of 0.249 inches and an inside diameter of 0.0625 inches, is slipped into place over the end of the helix tube and a counterpart surrounding the pigtail optical fiber.

Once the copper sleeve is in place over the tube ends, the sleeve 18 is swaged at each end. The swaging is accomplished in two steps at each end. The second swage step is accomplished after rotating the split die by 90 degrees around the longitudinal axis of the copper sleeve from the first position. A smaller die is used for the second stroke. The resulting outside diameter of the copper sleeve is 0.241 inches.

The annealed copper sleeve 18 swaged onto the full hard copper tubes forms two swaged joints which can withstand external water pressure of a magnitude of ocean bottom water pressure over a long duration without leaking.

This helical tube capstan arrangement enables the splice housing to have a smaller diameter than heretofore and still be passed over ship-mounted sheaves for laying or recovering the cable without breaking the optical fiber. Also, the splice housing can be flexible along its longitudinal axis for conforming with the shape of the sheave. During these cable laying and recovery operations, the helix can flex, i.e., either stretch or compress, without changing the holding force on the terminated fiber and without adding to optical loss in the fiber.

Although the small tubes holding the optical fibers have been described as copper tubes, other materials may be substituted for some applications. Copper is especially desirable for any application requiring high conductivity. A small amount of silver alloyed with the copper can reduce creep relaxation. Other materials, which are useful in some applications, include stainless steel and Iconel. See Smithells Metals Reference Book, 6th Ed. 1983, Edited by E. A. Brandes, Butterworth and Co. Ltd., London.

The foregoing describes an embodiment of the invention. The described embodiment and other embodiments made obvious in view thereof are considered to be covered by the appended claims.

What is claimed is:

1. An optical fiber submarine cable splice housing comprising
    a cable termination for terminating the optical fiber cable at the housing,
    a metallic tube formed in a helix shape inside of the splice housing and fixed to the cable termination, and
    an optical fiber extending from the cable termination through the helically-shaped tube and tensioned so that the helical tube performs a capstan function for limiting retraction of the optical fiber into the cable.

2. An optical fiber submarine cable splice housing, in accordance with claim 1, wherein
    a tensile force $T_1$, in the terminated end of the optical fiber, and a tensile force $T_2$, in the optical fiber where it exits the cable termination, are interrelated by an expression $$\frac{T_2}{T_1} = e^{\mu\alpha},$$

where $\mu$ is a coefficient of friction between the coated fiber and the metallic tube, $\alpha$ is the angle of wrap in the helix in radians, and e is the base of natural logarithms.

3. An optical fiber submarine cable splice housing comprising
    a cable termination for terminating the optical fiber cable at the housing,
    a metallic tube formed in a helix shape inside of the splice housing and fixed to the cable termination,
    an optical fiber extending from the cable termination through the helically-shaped tube and tensioned so that the helical tube performs a capstan function for limiting retraction of the optical fiber into the cable, and
    the metallic tube is fabricated in copper, and
    the optical fiber is coated with ultraviolet light cured urethane acrylic.

* * * * *